United States Patent [19]
van Os

[11] Patent Number: 4,562,798
[45] Date of Patent: Jan. 7, 1986

[54] CYLINDER HEAD LOCKING CONSTRUCTION

[75] Inventor: Cornelis J. van Os, Emmen, Netherlands

[73] Assignee: Noord-Nederlandsche Machinefabriek B.V., Winschoten, Netherlands

[21] Appl. No.: 563,579

[22] Filed: Dec. 20, 1983

[30] Foreign Application Priority Data

Dec. 23, 1982 [NL] Netherlands .......................... 8204972

[51] Int. Cl.⁴ ............................................. F01B 21/00
[52] U.S. Cl. ............................... 123/193 CH; 92/128; 92/169
[58] Field of Search ........ 123/193 R, 193 H, 193 CH, 123/41.82 A; 92/128, 169

[56] References Cited

U.S. PATENT DOCUMENTS 2,074,972  3/1937  Skinner ........................ 123/193 H
3,125,082  3/1964  Stansfield et al. ............ 123/193 CH
3,176,666  4/1965  Whitehead .................... 123/193 R
4,085,661  4/1978  Schriever ...................... 92/128

FOREIGN PATENT DOCUMENTS 1137191  12/1968  United Kingdom .................. 92/169

Primary Examiner—Craig R. Feinberg
Attorney, Agent, or Firm—Irvin A. Lavine

[57] ABSTRACT

A cylinder head locking construction for cylinders formed or placed in a casing of a motor, in which high working pressures occur. A segmented ring is partially placed in an annular groove formed in the casing of the motor transversely to the axis of the cylinder head. In operation a portion of the ring projecting from the groove rests on an adjacent portion of the cylinder head. A clamping ring is secured around a raised central portion of the cylinder head and presses the segments in the direction of the cylinder head portion, and at the same time prevents radially inward movement of the segments. The segments are pushed inwardly into contact with the clamping ring by a thrust member such as an O-ring.

14 Claims, 4 Drawing Figures

CYLINDER HEAD LOCKING CONSTRUCTION

This invention relates to a cylinder head locking construction for cylinders of engines in which high working pressures occur.

Normally cylinder heads are secured by means of bolts, which via bores in the cylinder head are screwed into the casing wall of the engine surrounding the cylinders. In particular in the case of hydraulic motors, however, very high pressures may occur in the cylinders in the order of 200 to 300 bar. Moreover, in such motors relatively large cylinder diameters may be used, especially in the case of so-called high-torque motors, for example, of the kind disclosed in Netherlands patent application No. 80,00115. With a very large cylinder diameter of 25 cm and a working pressure of about 210 bar, the load on the cylinder head is about 100 t. With smaller cylinder diameters the cylinder head is also subjected to heavy loads. With a cylinder diameter of 10 cm, for example, the load still is as high as about 16 t.

The construction according to the present invention is, however, suitable for any type of cylinder head.

This load on the cylinder head must be taken up by the cylinder head bolts that have hitherto been used, and by the screwthread in the material (for example, cast steel) of the motor case.

When there are loads in the order of magnitude indicated above, relatively many and thick bolts, for example 12 M42 bolts per cylinder, are required for safely securing the cylinder head.

For a not unusual engine construction with eight cylinders, this means that 96 very thick bolts are required, and that screwthread must be cut in 96 bores in the wall of the engine casing. It goes without saying that this is very labour-intensive, and involves high costs of machining. Moreover, the chance of failure in any of these screwthreads, either during the cutting of the screwthread, or during the fitting of these bolts, is relatively great. In that case, the engine casing is often no longer suitable for use.

Another problem is that the provision of the requisite large-diameter threaded bores requires the wall of the casing to be relatively thick in the region in question, which makes the construction of the engine rather inefficient, and in addition takes much material.

Furthermore, the heads of the bolts stand proud of the cylinder head, which in addition is often thickened in that region, so that the engine can be less compact than is sometimes desirable.

It is an object of the present invention to overcome the drawbacks outlined. For this purpose, a cylinder head locking construction of the kind described is characterized, according to the invention, by a segmented ring partially placed in an annular groove provided in the engine casing transverse to the axis of the cylinder head, said segmented ring, in operation, having a portion projecting from said groove and resting on an adjacent portion of the cylinder head, there being provided a clamping ring located around a raised central portion of the cylinder head, said clamping ring being secured to the cylinder head and pressing the segments in the direction of said cylinder head portion, and at the same time preventing radial inward movement of the segments, the segments being forced inwardly into contact with said clamping ring by thrust means.

It is observed that a construction for securing a cylinder cover, in which a ring built up from segments of wedge-shaped cross-sectional configuration extends into a groove of a cylinder barrel, per se, has been used previously for hydraulic cylinders having a piston with a piston rod extending through the cylinder cover.

Such a construction is described, for example, in Netherlands patent application 68,06395. This prior construction employs a segmented ring having an upper surface slanting outwardly and arranged to cooperate with an upper surface, also slanting outwardly, of a groove formed in a cylinder wall. Furthermore, the segmented ring has a tapered inner surface arranged to cooperate with a corresponding tapered outer surface of a thrust ring bolted to the cylinder cover. By tightening the bolts, the segments of the outer ring are forced into the groove of the cylinder wall. During this procedure, the bottom side of the segments continues to rest partially on the top of the cover being secured, so that this cover is forced into the cylinder into contact with a shoulder provided deeper within the cylinder. A sealing ring is provided between the shoulder and a corresponding annular surface of the cylinder cover.

A disvantage of this prior construction is that the elements have to be made with very small tolerances, because otherwise proper fastening and sealing cannot be achieved. This is partly a result of the absence of guide means for the inner surface of the thrust ring. In addition, the segments of the outer ring cannot be readily removed.

In U.S. Pat. No. 3,847,404, a similar construction is described for a cover of a hydraulic cylinder which, however, is less sensitive to tolerances, because the segments of the outer ring are drawn into the groove of the cylinder by bolts extending radially inwardly through a collar of the cylinder. It is not possible, however, to use such bolts for cylinders placed or formed in an engine block.

Some embodiments of the invention will now be described, by way of example, with reference to the accompanying drawings, in which FIG. 1 diagrammatically shows, in cross-sectional view, a first embodiment of a construction according to the invention.

Figure 1:
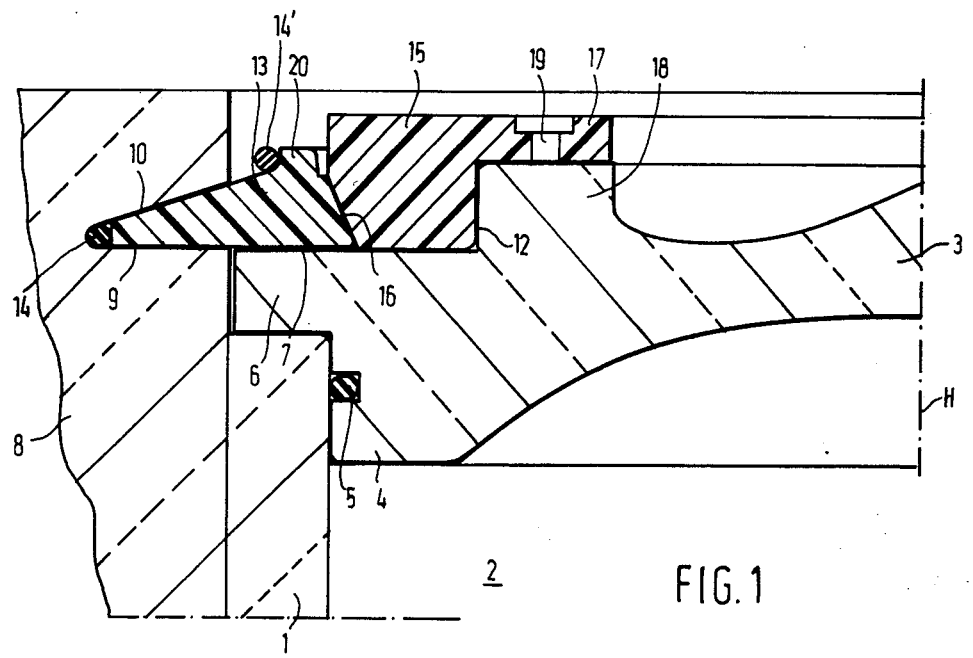

The figures show half of the construction for a single cylinder and cylinder head of a hydraulic engine, the other half being symmetrical.

A cylinder contains a working space or bore 2, in which a piston, not shown, can move up and down, under a cylinder head 3. The cylinder head 3 partially extends into the bore of the cylinder with a portion 4 which is an accurate fit in the bore. Provided in a suitable groove between the inner wall of the cylinder and the portion 4 of the cylinder head extending into the bore is a sealing ring 5. Furthermore, the cylinder head has a flange 6 lying on the upper rim of the cylinder wall, or if no separate cylinder barrel is used, but the bore is formed directly in casing 8, on a shoulder of the casing provided at an appropriate position.

At the side 7 remote from the rim of the cylinder barrel and the corresponding part of the motor casing, flange 6 of the cylinder head is faced true, to form a flat annular rim around the cylinder head.

Furthermore, at the level of the flat annular rim, a lateral annular groove 9 is formed in casing 8, which, in this example, as viewed from the heart of the cylinder head is of tapered configuration. The lower boundary face of the groove, as viewed in the drawing, is approximately co-planar with the flat annular rim of the cylinder head, and the upper boundary face 10 of the tapered groove 9 encloses an acute angle of, for example, 15° with the lower boundary face.

The flat annular rim of the cylinder head is bounded by an upright surface 12, located radially more inwardly, so that an annular space is provided between the material of the casing located above the tapered groove and the upright surface 12, in which space a segmented ring 13 can be laid. Ring 13 has a tapered cross-sectional configuration corresponding to the cross-sectional configuration of the tapered groove 9. The segments of ring 13 have such dimensions that, lying in contact with each other, they can just be laid in the annular space between surface 12 and the tapered groove.

Subsequently, the segments are moved radially outwardly into the tapered groove 9 until, approximately, the position shown in the figure is reached.

In order to accomplish that the tapered, segmented ring 13 continues to occupy the position indicated in FIG. 1, it can be secured to flange 6 by means of bolts not shown. Preferably, however, a clamping ring 15 is provided, which is placed in the space between the circumferential inner edge 16 of the tapered ring 13 and the upright surface 12 of the cylinder head. To ensure proper clamping action, the surface of the circumferential inner edge 16 enclosed an acute angle, of for example 15°, with the axis H of the cylinder head.

The circumferential outer surface of the clamping ring 15 has a complementary shape, so that the clamping ring 15 pushes the tapered ring 13 firmly into the tapered groove 9.

The clamping ring 15 can subsequently be secured to the cylinder head with a few bolts.

Figure 3:
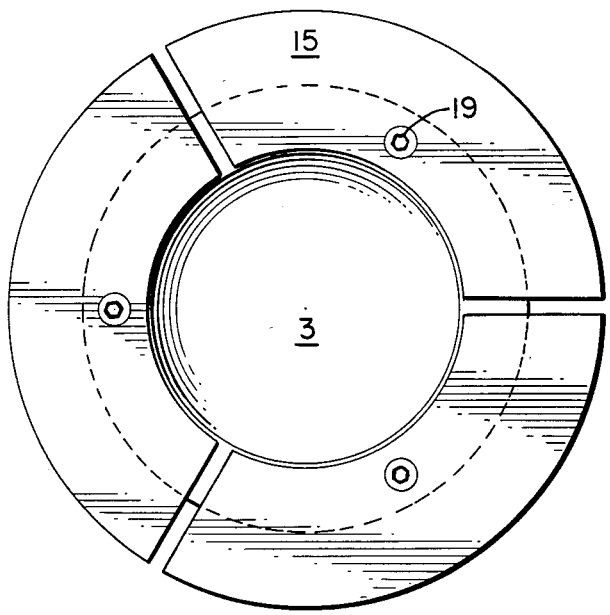
FIG. 3 shows a plan view of a modification of the first embodiment of the invention as shown in FIG. 1.

Preferably, for this purpose, the clamping ring 15, as shown in FIG. 1, is provided with a flange 17 directed to the axis of the cylinder head, which flange rests on a corresponding portion 18 of the cylinder head and is provided with a plurality of bores, through which bolts 19 can be inserted for them to be screwed into corresponding threaded bores 19' in the cylinder head. Like the tapered ring 13, the clamping ring 15 may consist of segments, as shown in FIG. 3, which simplifies assembly and disassembly work.

The tapered ring 13 is further provided at the top with a rib 20, on which, during disassembly work, after the removal of the clamping ring 15, a force can be exerted to drive the segments of the tapered ring from the tapered groove.

Figure 4:
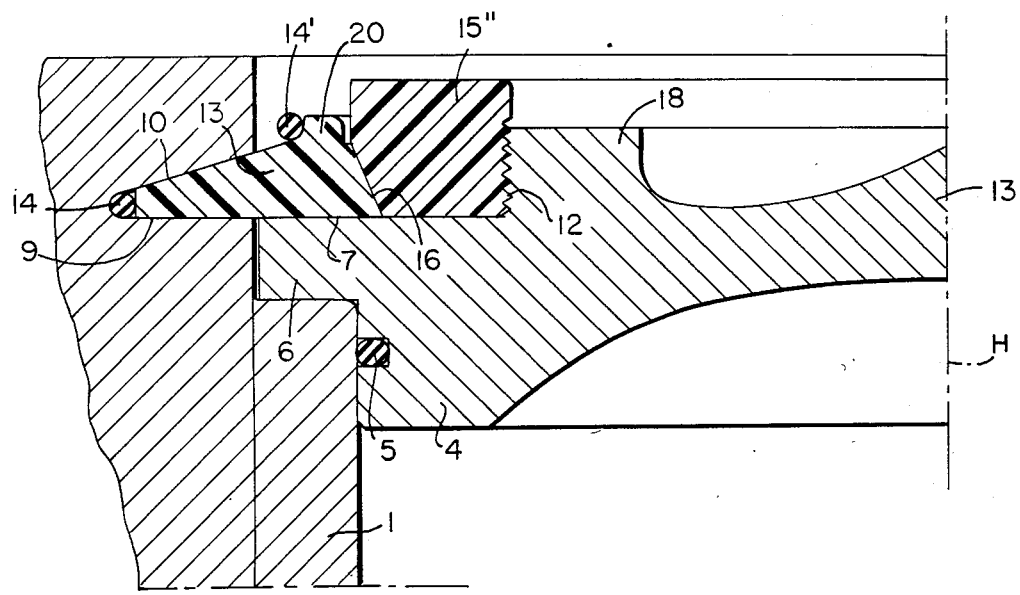
FIG. 4 shows, in cross-sectional view, a second modification of the first embodiment of the invention as shown in FIG. 1.

It is observed that various modifications of the construction shown and described will readily occur to those skilled in the art. Thus, for example as shown in FIG. 4, the upright face 12 of the cylinder head could be provided with screwthread, and so could the corresponding surface of the clamping ring 15, so that it can be screwed on to the cylinder head to lock the tapered ring 13. Flange 17 and bolts 19 can then be omitted. Such modifications are considered to fall within the scope of the invention.

Before the segments are placed in groove 9, according to the invention, first a plastics or rubber O-ring 14 is placed in the groove. The dimensions of the O-ring have been selected so that it provides a certain bias to push the segments into contact with the clamping ring 15.

The O-ring may also be laid around the rib 20 of the segments, as shown in broken lines in FIG. 1 at 14'. As a result of this feature, the segments are at all times held into contact with the clamping ring 15. As the location of the clamping ring is fixed by the upright face 12 of the cylinder head, this also fixes the radial position of the segments.

The resulting construction is insensitive to dimensional deviations. If, for example, there is any play between the tapered surfaces of the segments and the groove, or between the top face 7 of the cylinder head and the bottom face of the segments after assembly, as soon as there is any superatmospheric pressure within the cylinder, which in operation is always the case, the cylinder head will move upwards to such an extent that the top face of the segments is pushed into contact with the top face of the groove. The cylinder head has then "settled" and will further continue to occupy this position. During this procedure, the seal provided by the ring 5 is fully maintained.

Instead of an O-ring, other means can be used to push the ring segment into contact with the clamping ring, such as, for example, a spring ring.

The foregoing shows that the tapered form of the groove and the surface of the ring segments cooperating with it is not essential.

Figure 2:
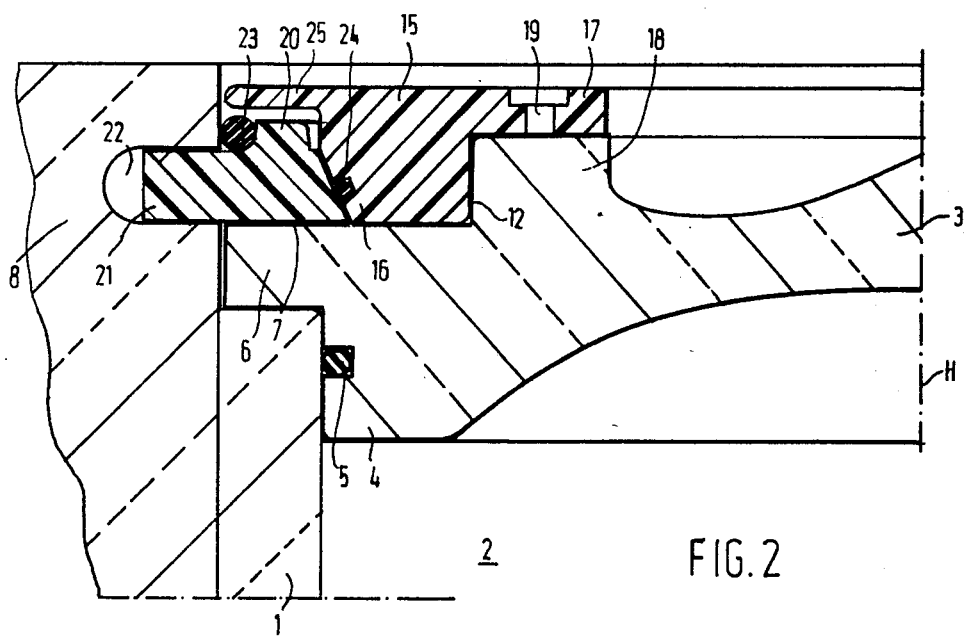
FIG. 2 shows a second embodiment of a construction according to the invention.

FIG. 2 shows a second exemplary embodiment of the invention, in which a substantially rectangular groove is used and ring segments with a corresponding shape. The embodiment of FIG. 2 has, instead of a tapered segmented ring, a segmented ring 21 comparable to the ring 13 of FIG. 1, which, to the extent it is designed to be moved into a groove 22 corresponding to groove 9 of FIG. 1, is of rectangular cross-sectional configuration. In the example shown, groove 22 has parallel top and bottom walls, and a curved end wall.

In the embodiment of FIG. 2, an O-ring 23, corresponding to ring 14' of FIG. 1, is laid between rib 20 of the segments of ring 21 and the casing material present above groove 22.

Rib 20 may be interrupted at uniform intervals, so that the O-ring 23 can be readily removed during disassembly. Naturally, the rib may also be interrupted in the embodiment shown inn FIG. 1. Similarly, in the embodiment shown in FIG. 1, ring 14 may be arranged in the position shown in FIG. 2.

If, in the same way as shown with regard to ring 13 in FIG. 1, ring 21 is locked by means of a clamping ring 15', the ring may again be bevelled on the inside, as shown in FIG. 1, for cooperation with the corresponding surface of the clamping ring. It is also possible to form a horizontal face on the clamping ring to press on a horizontal face of ring 21.

FIG. 2 further shows that the clamping ring 15' may have a flange 25 overlying the segments. This imparts a smoother surface to the motor and prevents the deposition of dirt.

FIG. 2 shows a second O-ring 24, lying in a recess in the surface of the clamping ring that is in contact with ring 21. Such an O-ring can be used as a pilot means in guiding the clamping ring to its position during assembly without metal-to-metal contact.

I claim:

1. A hydraulic expansible chamber device comprising:

a casing;

at least one cylinder located in said casing, said cylinder having a cylinder head having a longitudinal axis, a circumferential flange having a top surface, and a central raised portion;

an annular groove formed in said casing adjacent the top surface of said cylinder head flange;

a ring divided into a plurality of segments and having an inner circumferential portion and an outer circumferential portion, said outer circumferential portion being positioned in said annular groove, and said inner circumferential portion projecting from said annular groove having an upwardly extending means on top thereof spaced from said casing, said inner circumferential portion resting on the top surface of said cylinder head flange;

clamping ring means positioned around and abutting against said central raised portion of said cylinder head and secured to said cylinder head, for pressing said segmented ring towards the top of said cylinder head flange and preventing radially inward movement of said segmented ring; and thrust means positioned adjacent a side of said upwardly extending means of said inner circumferential portion of said segmented ring for urging each of said segments radially inwardly into contact with said clamping ring means.

2. A hydraulic expansible chamber device comprising:

a casing;

at least one cylinder located in said casing, said cylinder having a cylinder head having a longitudinal axis, a circumferential flange having a top surface, and a central raised portion;

an annular groove formed in said casing adjacent the top surface of said cylinder head flange;

a ring divided into a plurality of segments and having an inner circumferential portion and an outer circumferential portion, said outer circumferential portion being positioned in said annular groove, and said inner circumferential portion projecting from said annular groove having an upwardly extending means on top thereof spaced from said casing, said inner circumferential portion resting on the top surface of said cylinder head flange;

clamping ring means positioned around and abutting against said central raised portion of said cylinder head and secured to said cylinder head, for pressing said segmented ring towards the top of said cylinder head flange and preventing radially inward movement of said segmented ring; and resilient thrust means positioned adjacent a side of said upwardly extending means of said inner circumferential portion of said segmented ring for resiliently urging at least one of said segments radially inwardly into contact with said clamping ring means.

3. The device according to claim 2, said annular groove in said casing having a tapered cross-section, and at least said outer circumferential portion of said segmented ring being complementary in shape to said annular groove.

4. The device according to claim 2, said annular groove in said casing having a rectangular cross-section, and at least said outer circumferential portion of said segmented ring being complementary in shape to said annular groove.

5. The device according to claim 2, further comprising additional thrust means comprising a resilient O-ring positioned in said annular groove in said casing.

6. The device according to claim 2, said clamping ring means being divided into a plurality of segments.

7. The device according to claim 2, said clamping ring means and said central raised portion of said cylinder head being provided respectively with cooperating interior and exterior screw threads to secure said clamping ring means to said cylinder head.

8. The device according to claim 2, said clamping ring means having a circumferential flange at least partially overlying said inner circumferential portion of said segmented ring.

9. The device according to claim 2 said upwardly extending means comprising a rib formed on the top of said inner circumferential portion, and said thrust means acting on each said rib.

10. The device according to claim 9, said thrust means comprising an O-ring positioned around and abutting each said rib.

11. The device according to claim 2, said clamping ring means and said cylinder head being provided with corresponding bores, and further comprising fastening means inserted in said corresponding bores for securing said clamping ring means to said cylinder head.

12. The device according to claim 11, said clamping ring means having a flange positioned on top of and being substantially contiguous with said central raised portion of said cylinder head, said bores in said clamping ring means being positioned in said clamping ring flange.

13. The device according to claim 2, said clamping ring means having a circumferential outer face enclosing an acute angle with said axis of said cylinder head and extending inwardly towards the top of said cylinder head flange, and said segmented ring having a circumferential inner face abutting and complementary in shape to said circumferential outer face of said clamping ring means.

14. The device according to claim 13, said circumferential outer face of said clamping ring means being provided with an annular groove which cooperates with said circumferential inner surface of said segmented ring, and further comprising an O-ring positioned in said groove in said clamping ring means.

* * * * *